United States Patent
Suzuki et al.

(10) Patent No.: US 8,935,740 B2
(45) Date of Patent: Jan. 13, 2015

(54) VIDEO SIGNAL TRANSMISSION APPARATUS, IDENTIFICATION INFORMATION ACQUISITION METHOD FOR VIDEO SIGNAL TRANSMISSION SYSTEM AND COMPUTER READABLE MEDIUM STORING IDENTIFICATION INFORMATION ACQUISITION PROGRAM FOR VIDEO SIGNAL TRANSMISSION SYSTEM

(75) Inventors: Kazuhiro Suzuki, Kanagawa (JP); Masao Funada, Kanagawa (JP); Kazuhiro Sakai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 233 days.

(21) Appl. No.: 12/987,578

(22) Filed: Jan. 10, 2011

(65) Prior Publication Data

US 2011/0277011 A1 Nov. 10, 2011

(30) Foreign Application Priority Data

May 10, 2010 (JP) ................................. 2010-108161

(51) Int. Cl.
*H04N 7/16* (2011.01)
*H04B 10/00* (2013.01)
*H04N 7/18* (2006.01)

(52) U.S. Cl.
CPC ............... *H04B 10/12* (2013.01); *H04N 7/183* (2013.01)
USPC ....................................................... 725/149

(58) Field of Classification Search
CPC .............................................. H04N 21/43635
USPC .......................................................... 725/149
See application file for complete search history.

(56) References Cited

U.S. PATENT DOCUMENTS

2003/0034963 A1* 2/2003 Moon et al. .................. 345/204
2004/0221315 A1* 11/2004 Kobayashi .................... 725/126

(Continued)

FOREIGN PATENT DOCUMENTS

CN 1773447 A 5/2006
JP A-2002-366340 12/2002

(Continued)

OTHER PUBLICATIONS

Jan. 14, 2014 Office Action issued in Japanese Application No. 2010-108161 (with English Translation).

(Continued)

*Primary Examiner* — Junior Mendoza
(74) *Attorney, Agent, or Firm* — Oliff PLC (57) ABSTRACT

The present invention provides a video signal transmission apparatus including: an optical transmitter that uni-directionally transmits video data from a video source; an optical receiver that receives the video data and outputs the received video data to a sink device; a first transmission medium that transmits the video data at a high speed; a second transmission medium that transmits identification information for identifying the sink device at a low speed; an identification information acquisition control section that acquires the identification information from the sink device; a storage section that stores general-purpose identification information used for plural types of sink devices; a acquisition possibility determination section that determines whether the identification information can be acquired from the sink device; and a general-purpose identification information reply control section that replies the stored general-purpose identification information to the video source device if determined that the identification information cannot be acquired.

8 Claims, 4 Drawing Sheets

(56) References Cited

U.S. PATENT DOCUMENTS

| | | |
|---|---|---|
| 2006/0082587 A1 | 4/2006 | Noorbakhsh et al. |
| 2006/0091943 A1* | 5/2006 | Noorbakhsh et al. ......... 327/603 |
| 2006/0277586 A1 | 12/2006 | Baba et al. |
| 2007/0220150 A1* | 9/2007 | Garg ............................. 709/226 |
| 2007/0222779 A1* | 9/2007 | Fastert et al. ................. 345/418 |
| 2007/0283071 A1 | 12/2007 | Konishi |
| 2008/0022023 A1* | 1/2008 | Kim et al. ...................... 710/72 |
| 2009/0160883 A1 | 6/2009 | Sonobe |
| 2009/0177818 A1* | 7/2009 | Shim et al. .................... 710/100 |
| 2010/0020183 A1 | 1/2010 | Kimoto et al. |
| 2010/0275234 A1* | 10/2010 | Kamon et al. .................. 725/58 |
| 2011/0091219 A1* | 4/2011 | Tatum et al. .................. 398/142 |
| 2011/0221976 A1* | 9/2011 | Kikkawa ....................... 348/739 |

FOREIGN PATENT DOCUMENTS

| | | |
|---|---|---|
| JP | A-2005-51730 | 2/2005 |
| JP | A-2006-58549 | 3/2006 |
| JP | A-2006-325081 | 11/2006 |
| JP | A-2007-53675 | 3/2007 |
| JP | B1-3952077 | 5/2007 |
| JP | A-2009-151172 | 7/2009 |
| JP | A-2010-28553 | 2/2010 |
| KR | 2004-0095397 A | 11/2004 |
| KR | 2009-0092118 A | 8/2009 |

OTHER PUBLICATIONS

Jan. 21, 2014 Office Action issued in Korea Application No. 10-2011-0010080 (with English Translation).

Aug. 5, 2014 Office Action issued in Chinese Patent Application No. 201110033402.8 (with translation).

* cited by examiner

VIDEO SIGNAL TRANSMISSION APPARATUS, IDENTIFICATION INFORMATION ACQUISITION METHOD FOR VIDEO SIGNAL TRANSMISSION SYSTEM AND COMPUTER READABLE MEDIUM STORING IDENTIFICATION INFORMATION ACQUISITION PROGRAM FOR VIDEO SIGNAL TRANSMISSION SYSTEM

CROSS-REFERENCE TO RELATED APPLICATION

This application is based on and claims priority under 35 USC 119 from Japanese Patent Application No. 2010-108161 filed on May 10, 2010.

BACKGROUND

1. Technical Field

The present invention relates to a video signal transmission apparatus, an identification information acquisition method for a video signal transmission system, and a computer readable medium storing an identification information acquisition program for a video signal transmission system.

2. Related Art

A serial data signal for a digital video so called a DVI (Digital Visual Interface) or HDMI (High Definition Multimedia Interface) requires high-speed signal which is equal to or higher than 1 Gbps. Therefore, such signal can be transmitted only up to about 10 m, when transmitted by an electric cable. Accordingly, when transmission of such signal for more than 10 m is required, the serial data signal needs to be converted into an optical signal and an optical fiber may be used to transfer such optical signal. In the case of using the optical fiber, an optical transmitter and an optical receiver, connected to both ends of the optical fiber, may be provided between a video source device such as a PC (including a video card) and a sink device such as a display.

The serial data signal includes a high-speed video signal, information of the display (hereinafter referred to as "EDID"), and a DDC (Display Data Channel) control system signal used to exchange an encryption key called an HDCP (High-bandwidth Digital Content Protection). Since this DDC control system signal is a DC signal or a low-speed signal of lower than 100 KHz, and is a bidirectional signal. The DDC control system signal may be transmitted through a metal cable such as a LAN (Local Area Network) cable.

Namely, when transmitting the serial data signal of digital video, different kinds of cables may be used to transmit the video signal and the DDC control system signal, respectively.

The HDCP is a type of digital copyright management technology that functions to prevent illegal copying by encrypting a digital type image or an output signal of video content.

Also, the DDC is a standard for exchanging various kinds of information between the display and the PC for realizing PnP (Plug and Play). According to the DDC, information representing permissible resolution of a display, color depth, a scanning frequency, and a model number of a product is exchanged between the PC (video source device) and the display (sink device). Through the exchange of the information, setting information of the display is transferred, and thus the setting is automatically performed to match the performance of the respective displays.

SUMMARY

According to a first aspect of the present invention, there is provided a video signal transmission apparatus including: an optical transmitter, connected to a video source device, that uni-directionally transmits video data input from the video source device; an optical receiver, connected to a sink device, that receives the video data transmitted from the optical transmitter and outputs the received video data to the sink device; a first transmission medium, connected to the optical transmitter and the optical receiver, that transmits the video data at a speed higher than a predetermined reference transmission speed; a second transmission medium, connected to the optical transmitter and the optical receiver independently from the first transmission medium, that transmits identification information for identifying the sink device at a speed lower than the predetermined reference transmission speed; an identification information acquisition control section, provided in the optical transmitter, that acquires the identification information from the sink device through a bidirectional communication using the second transmission medium in accordance with a request from the video source device; a storage section, provided in the optical receiver, that stores general-purpose identification information generally used for a plurality of types of sink devices that are connectable to the optical receiver; an acquisition possibility determination section that determines whether the identification information can be acquired from the sink device; and a general-purpose identification information reply control section that replies the general-purpose identification information stored in the storage section to the video source device if the acquisition possibility determination section determine that the identification information cannot be acquired.

BRIEF DESCRIPTION OF THE DRAWINGS

Exemplary embodiments of the present invention will be described in detail based on the following figures, wherein.

DETAILED DESCRIPTION

Herebelow, an example of an exemplary embodiment of the present invention will be described in detail with reference to the drawings.

Figure 1:
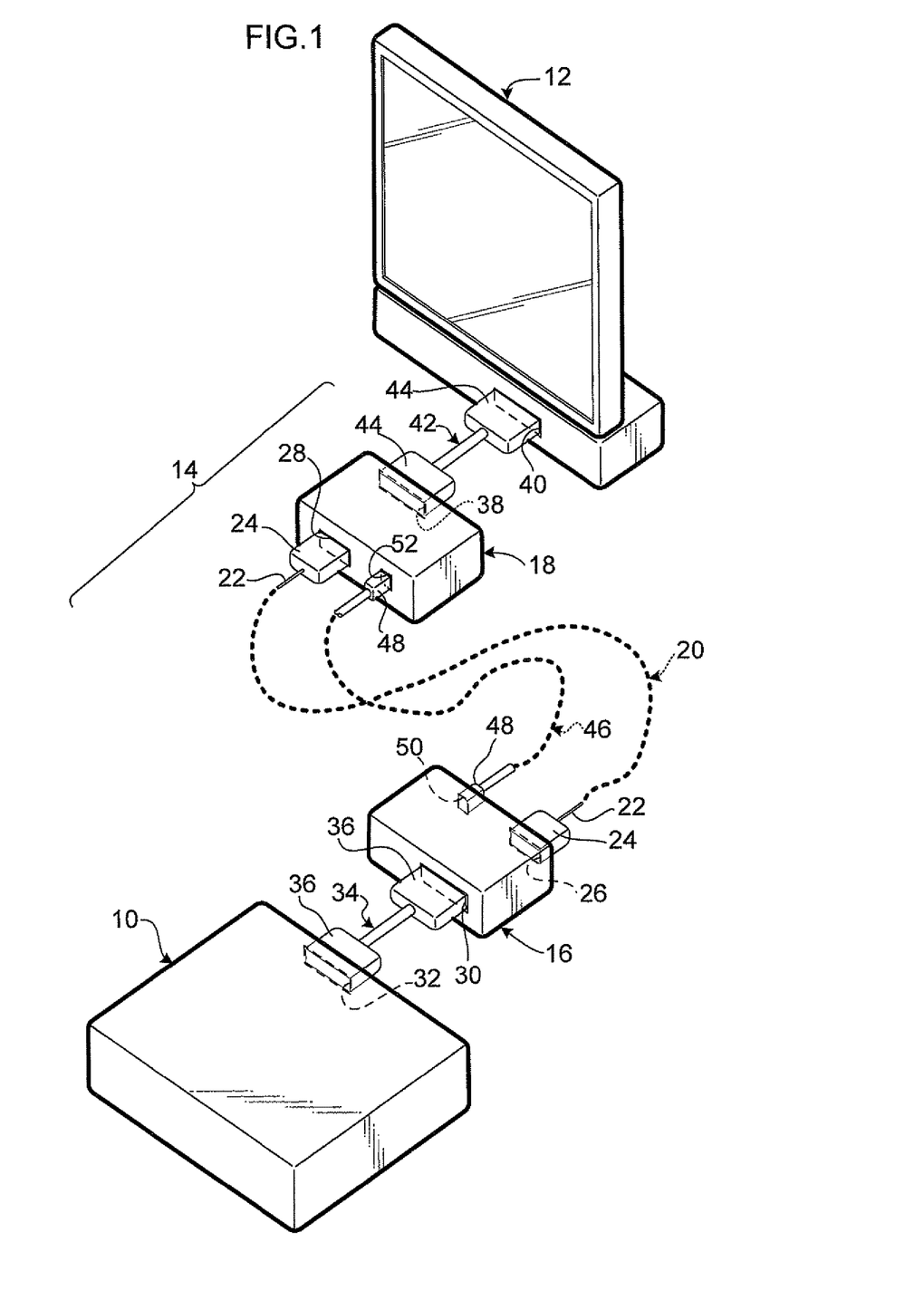
FIG. 1 is a structural diagram illustrating the configuration of a video signal transmission system according to an exemplary embodiment of the present invention.

FIG. 1 is a structural diagram illustrating the configuration of a video signal transmission system according to an exemplary embodiment of the present invention.

In a video signal transmission system, a host computer 10 and a display 12 are connected through a video signal transmission apparatus 14 for optical communication of a video signal. The host computer 10 is applicable as a video source device. The display 12 is applicable as a sink device.

The video signal transmission apparatus 14 includes an optical transmitter 16, an optical receiver 18, and an optical fiber cable 20. The optical fiber cable 20 is provided between the optical transmitter 16 and the optical receiver 18.

The optical fiber cable 20 includes an optical fiber harness 22 for respective colors (R, G, and B) and a clock (CLK) which corresponds to a DVI video signal. Both end portions of the optical fiber harness 22 are bundled and are connected to optical fiber connectors 24, respectively. Each optical fiber connector 24 is connected to an optical transmission interface 26 of the optical transmitter 16, and an optical reception interface 28 of the optical receiver 18, respectively.

The optical transmitter 16 includes an interface 30 for receiving a serial data signal of a digital video, such as DVI or HDMI, from the host computer 10. The host computer 10 includes an interface 32 for outputting a serial data signal of the digital video. Accordingly, the host computer 10 and the optical transmitter 16 are electrically connected when the connectors 36 installed at both ends of the DVI or HDMI dedicated connection cable 34 are connected to the interface 32 of the host computer 10 and the interface 30 of the optical transmitter 16.

Further, the optical receiver 18 includes an interface 38 for outputting the serial data signal of the digital video, such as DVI or HDMI, to the display 12. The display 12 includes an interface 40 for receiving the serial data signal of the digital video. Accordingly, the optical receiver 18 and the display 12 are electrically connected when the connectors 44 installed at both ends of the DVI or HDMI dedicated connection cable 42 are connected to the interface 38 of the optical receiver 18 and the interface 40 of the display 12.

Here, the serial data signal of the digital video, such as DVI or HDMI, includes a DDC control system signal in addition to the video signal.

The DDC control system signal is a standard for transmitting/receiving information between the host computer 10 and the display 12 for realizing PnP (Plug and Play). In the communication of the DDC control system signal (hereinafter referred to as "DDC communication"), information representing a permissible resolution of the display 12, color depths, a scanning frequency, and a model number of a product is exchanged between the host computer 10 and the display 12. According to this information, the setting is automatically performed to match the performance and specification of the display 12 connected to the optical receiver 18.

The optical transmitter 16 transmits only the video signal to the optical receiver 18 through the optical fiber cable 20 in uni-directional communication. Optical communication using the optical fiber is advantageous in transmitting a high-speed signal of equal to or higher than 1 Gbps over a transmission distance of equal to or longer than 10 m. In other words, the high-speed signal of equal to or higher than 1 Gbps has the limit of transmission distance of 10 m, when transmitted via a metal cable. In the present exemplary embodiment, the optical communication by the optical fiber is performed particularly in transmitting the video signal.

On the other hand, the DDC control signal is a low-speed signal (in comparison to the transmission speed of the video signal) of about 100 kHz, and also requires bidirectional communication. Accordingly, in the present exemplary embodiment, the DDC control signal is bidirectionally communicated by using a LAN cable 46 which is cheaper than the optical fiber cable 20 and can be applied as a metal cable.

Namely, as illustrated in FIG. 1, in the optical transmitter 16 and the optical receiver 18, LAN interfaces 50 and 52 are provided, to which the connectors 48 connected to the end portions of the LAN cable 46 are connectable.

Figure 2:
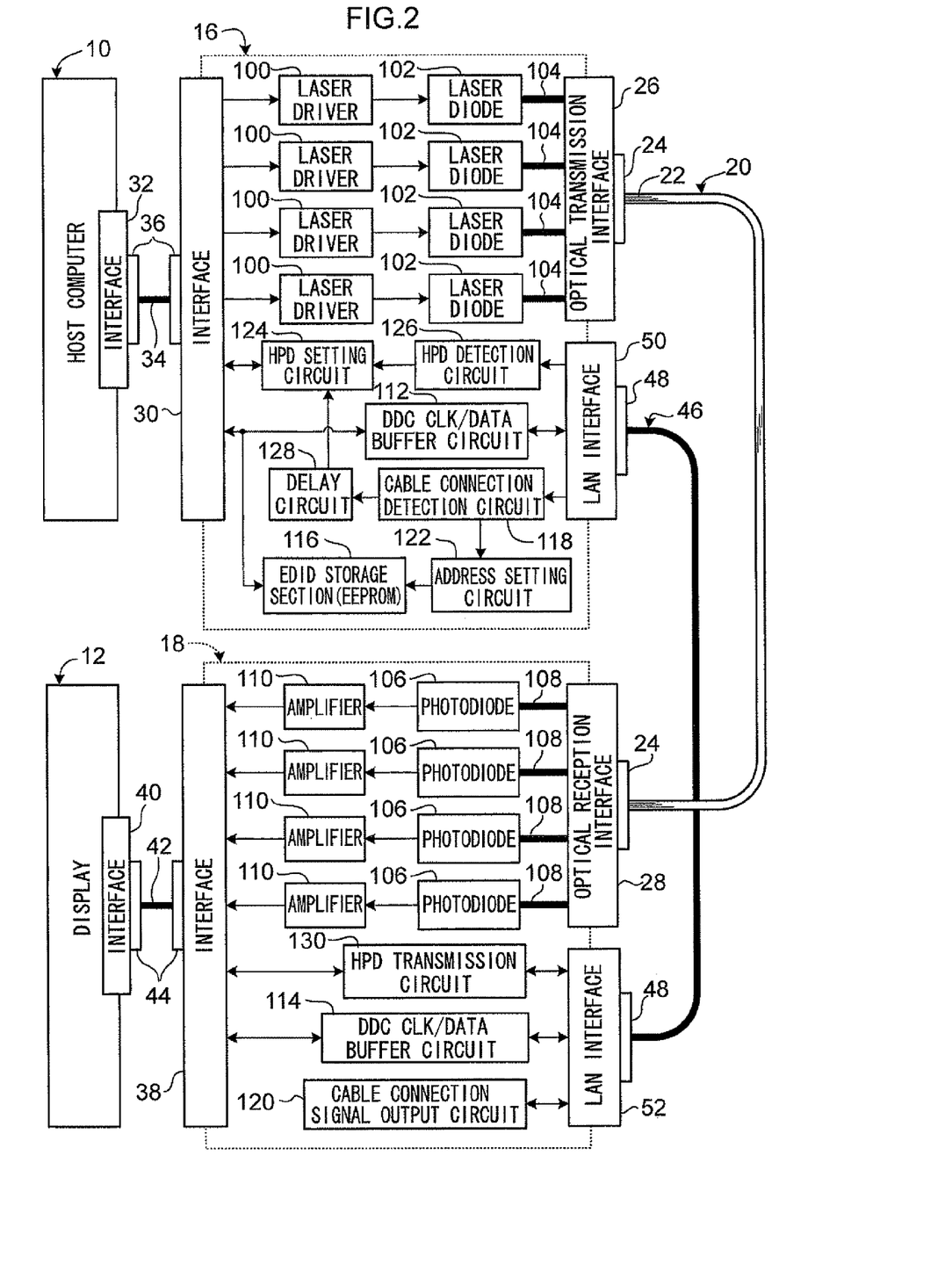
FIG. 2 is a functional block diagram illustrating an electrical connection in a video signal transmission system according to an exemplary embodiment of the present invention.

FIG. 2 is a functional block diagram illustrating an electrical connection in a video signal transmission system shown in FIG. 1.

[Video Signal Transmission System]

Four laser drivers 100 are connected to the interface 30 of the optical transmitter 16 respectively. The DVI video signals R, G, B, and CLK from the host computer 10 is input to the four laser drivers 100.

Laser diodes 102 are connected to the four laser drivers 100. The laser diodes 102 emit light or are turned OFF based on light-emitting control signals from the laser drivers 100. Namely, the light emitting of the laser diodes is controlled based on the video signal input to the laser drivers 100.

The laser diode 102 is connected to one end of each optical fiber 104. The other end of the optical fiber 104 is connected to the optical transmission interface 26. At one side of the optical fiber connector 24 of the optical fiber cable 20, the optical transmission interface 26 is connected. The optical transmission interface 26 configures the optical fiber 104 connected to the laser diode 102 and the optical fiber constituting the optical fiber cable 20, substantially coaxial with each other. Note that the term "substantially" means that the light emitted from the laser diode 102 is optically coaxial to the optical fiber cable 20, and may not be physically coaxial.

The other-side of the optical fiber connector 24 of the optical fiber cable 20 is connected to the optical reception interface 28 of the optical receiver 18. The optical reception interface 28 has a function that is equal to the optical transmission interface 26. Namely, four photodiodes 106 are installed in the optical receiver 18, and one end of each optical fiber 108 is connected to the optical receiver 18, respectively. In the optical fiber cable 20, the surface of one end portion of the four optical fibers are configured to be substantially coaxial with the surface of the other end portion of the optical fibers 108 connected to the photodiodes 106. The surfaces of the end portions of the four optical fibers exchange optical communication information (namely, the optical converted video signal). Note that the term "substantially" means that the light emitted from the optical fiber on the side of the optical fiber cable 20 is optically coaxial to the optical fiber 108 on the side of the optical receiver 18, and may not be physically coaxial.

The four photodiodes 106 are connected to amplifiers 110, respectively. The amplifiers 110 amplify the converted electric signals received by the photodiodes 106, convert the electric signals into a DVI video signal R, G, B, and CLK, and output the DVI video signal to the display 12 through the interface 38.

[DDC Communication Control Process]

The DDC communication control process is executed by the host computer 10 when it is recognized that the display 12 is connected in an HPD determination control process, which will be described later.

A DDC-CLK/DATA buffer circuit (hereinafter simply referred to as "buffer circuit") 112 is connected to the interface 30 of the optical receiver 14.

The buffer circuit 112 is connected to a buffer circuit 114 of the optical receiver 18 through the LAN interfaces 50 and 52 and the LAN cable 46.

When DDC communication control process, the host computer 10 outputs an address that specifies a storage area of the display 12 in order to acquire a display identification code (hereinafter referred to as "EDID") stored in a storage area (not illustrated) within the display 12.

The buffer circuit 112 at the optical transmitter 16 acquires the EDID by accessing the storage area of the display 12 through the buffer circuit 114 at the optical receiver 18, based on the address. The EDID acquired by the buffer circuit 112 at the optical transmitter 16 is output to the host computer 10.

The host computer 10 executes processes such as correction of the video signal based on the acquired EDID.

In the present exemplary embodiment, a configuration that transmits the video signal is configured even when the LAN cable 46 is not connected.

When the LAN cable 46 is not connected, the DDC communication control process can not be executed. Therefore, in the present exemplary embodiment, a storage section 116 that stores a virtual EDID is installed at the optical transmitter 16. When the LAN cable 46 is connected, a form that acquires the EDID from the display 12 actually connected (hereinafter referred to as "first form") is selectively executed, while when the LAN cable 46 is not connected, a form that acquires the virtual EDID from the EDID storage section 116 (hereinafter referred to as "second form") is selectively executed.

In order to select the first form or the second form, a cable connection detection circuit 118 is provided in the optical transmitter 16.

The cable connection detection circuit 118 is connected to a cable connection signal output circuit 120 of the optical receiver 18 through the LAN interfaces 50 and 52 and the LAN cable 46.

The cable connection signal output circuit 120, for example, has a simple loop circuit formed therein, and the cable connection detection circuit 118 determines the connection state of the LAN cable 46 by detecting whether a voltage applied from the corresponding cable connection detection circuit 118 is maintained and returns thereto.

The cable connection signal detection circuit 118 is connected to an address setting circuit 122. This address setting circuit 122 is connected to the EDID storage section 116. The address setting circuit 122 serves to set an address that is equal the storage area of the display 12 with respect to the corresponding EDID in the storage section 116.

Namely, the cable connection detection circuit 118 outputs H (high level) signal to the address setting circuit 122 when the LAN cable 46 is connected, and outputs L (low level) signal to the address setting circuit 122 when the LAN cable 46 is not connected.

The address setting circuit 122 does not set the address with respect to the EDID storage section 116 when H signal is received from the cable connection detection circuit 118 (execution of the first form). On the other hand, the address setting circuit 122 sets the address with respect to the EDID storage section 116 when L signal is received from the cable connection detection circuit 118 (execution of the second form).

When an address is set in the EDID storage section 116, the LAN cable 46 is not connected. Accordingly, the host computer 10 acquires the virtual EDID from the EDID storage section 116 based on the address reported in the DDC communication control process.

[HPD Determination Control Process]

An HPD setting circuit 124 is connected to the interface 30 of the optical transmitter 16. The HPD setting circuit 124 reports whether the display 12 is connected to the host computer 10. More specifically, the HPD setting circuit 124 outputs a different two-value signal when the display 12 is connected or is not connected (for example, H signal when the display is connected, and L signal when the display is not connected).

When it is recognized that the display 12 is connected through the HPD signal, the host computer 10 executes the above-described DDC communication control process.

In the present exemplary embodiment, even in the case where the LAN cable 46 is not connected, the HPD setting circuit 124 operates control to falsely report that the display 12 is connected to the host computer 10. Namely, in the present exemplary embodiment, the first form and the second form are used together.

Accordingly, the HPD setting circuit 124 is connected to the cable connection detection circuit 118 through the HPD detection circuit 126 and the delay circuit 128. The details of the delay circuit 128 will be described later.

[First Form]

The HPD detection circuit 126 is connected to an HPD detection transmission circuit 130 of the optical receiver 18 via the LAN interfaces 50 and 52 and the LAN cable 46. For example, in the case where the display 12 is connected, the HPD detection transmission circuit 130 outputs a detection signal of 5 V (H signal) to the HPD detection circuit 126. On the other hand, in the case where the display 12 is not connected, the HPD detection transmission circuit 130 output a detection signal of 0 V (L signal) to the HPD detection circuit 126. This signal is output to the HPD setting circuit 124, and when the signal from the cable connection detection circuit 118 is a signal ("H signal" to be described later) that indicates the LAN cable in a connected state, the HPD setting circuit 124 outputs the signal which indicates that the display 12 is connected, to the host computer 10.

As a result, the host computer 10 recognizes whether the display 12 is connected or not by the signal from the HPD setting circuit 124, and executes the DDC communication control process accordingly.

[Second Form]

On the other hand, when the signal from the cable connection detection circuit 118 is the signal ("L signal") that indicates the LAN cable in a disconnected state, the HPD setting circuit 124 converts the HPD signal into the H signal (false signal), and outputs the H signal to the host computer 10. The host computer 10 recognizes whether the display 12 is connected or not by the signal from the HPD setting circuit 124, and executes the DDC communication control process accordingly. Namely, according to the second form, even in the case where the LAN cable 46 is not connected, the false HPD signal is output as if the display 12 was connected, and thus the host computer 10 executes the DDC communication control process accordingly.

[Function of Delay Circuit]

Here, as described above, a delay circuit 128 is provided between the HPD setting circuit 124 and the cable connection detection circuit 118. The delay circuit 128 delays the transmission of the signal from the cable connection detection circuit 118 for 150 msec.

As a result, the HPD setting circuit 124 converts the H signal into the L signal after 150 msec, starting from a time when the connected LAN cable 46 is disconnected (or starting from a time when the disconnected LAN cable is connected).

Namely, at an initial setting such as starting (power ON) of the host computer 10, the host computer 10 executes the DDC communication control process regardless of the connection/disconnection of the LAN cable 46. However, in the case where the LAN cable 46 is disconnected during the operation of the host computer 10 (for example, outputting of the video signal or the like), the host computer 10 instantaneously (for example, in 100 msec or shorter) performs conversion from a true HPD signal (H signal) into a false HPD signal (H signal) using the signal from the cable connection detection circuit 118.

On the other hand, during the execution of the DDC communication control process, a detection period of the L signal of the HPD signal equal to or longer than 100 msec is required. Therefore, the host computer 10 is unable to execute (re-execute) the DDC communication control process when the LAN cable 46 is disconnected.

Accordingly, by intentionally generating a disconnected state of the LAN cable 46 for equal to or longer than 150 msec by the delay circuit 128, the execution of the DDC communication control process can be secured.

In the above, a case in which the LAN cable 46 in a connection state is disconnected during the operation (outputting of the video signal) has been described, however, the reverse is also the same. Namely, when disconnected LAN cable 46 is connected during the operation (outputting of the video signal), the signal sent from the HPD setting circuit 124 to the host computer 10 is temporarily (150 msec) in an L signal state, in the same manner.

Table 1 shows the output of the cable connection detection circuit 128 (LAN cable detection), the output of the HPD detection circuit 126 (HPD detection), and the output of the HPD setting circuit 124 (HPD output) based on the connection state of the LAN cable 46 and the connection state of the display 12.

In Table 1, "non-detection (L)" indicates that the communication system from the HPD transmission circuit 130 to the HPD detection circuit 126 is disconnected due to disconnection of the LAN cable 46, and as a result, a non-detection signal (L signal) is produced.

Further, in Table 1, "false H" indicates that the original signal is the L signal, but in order to realize the second form, the H signal is falsely output from the HPD setting circuit 124 to the host computer 10.

TABLE 1

| A signal LAN cable detection | B signal HPD detection | C signal HPD output | State |
|---|---|---|---|
| H | H | H shifted from state (d) to H after 150 msec (L) (*1) | (a) LAN cable connected, display connected |
| H | L | L | (b) LAN cable connected, display disconnected |
| L | Non-detection (L) | False H | (c) LAN cable disconnected, display disconnected |
| L | Non-detection (L) | False H shifted from state (a) to false H after 150 msec (L) | (d) LAN cable disconnected, display connected |

* For each output signal, H denotes detection, and L denotes non-detection
(*1) When A signal is L and B signal is H, C signal becomes L (in the case where A signal is delayed)

In Table 1, when shifting from state (a) to state (d), namely, in the case where the connected LAN cable 46 is disconnected, the HPD setting circuit 124 outputs a false H signal to the host computer 10 after temporarily (for a period of 150 msec) outputting a L signal. Accordingly, the DDC communication control process can be executed.

On the other hand, in Table 1, when shifting from state (d) to state (a), namely, in the case where the disconnected LAN cable 46 is connected, the HPD setting circuit 124 outputs a H signal to the host computer 10 after temporarily (for a period of 150 msec) outputting a L signal. Accordingly, the DDC communication control process can be executed.

Hereinafter, the operation in the present exemplary embodiment will be described.

Firstly, a flow of video signal transmission process when the optical fiber cable 20 and the LAN cable 46 are connected during power ON, will be described.

When the power is input to the host computer 10, the optical transmitter 16, the optical receiver 18, and the display 12, the host computer 10 receives an HPD detection signal from the HPD setting circuit 124 of the optical receiver 16, and confirms the connection state of the display 12.

When it is confirmed that the display 12 is connected, the host computer 10 executes the DDC communication control process for acquiring the EDID of the display 12 through a buffer circuit 112 of the optical transmitter 16.

When a control signal form acquiring EDID information is received, the display 12 outputs a signal that indicates the EDID information, and the host computer 10 acquires the EDID information through a buffer circuit 114, the LAN cable 46, and the buffer circuit 112.

Next, when the EDID is acquired, the host computer 12 recognizes a type of the display 12 and set values based on the corresponding EDID, generates and outputs a video signal that is in the specification of the display 12 based on the image information. This video signal is transmitted from the optical transmitter 16 to the optical receiver 18 through the optical fiber cable 20.

Next, the optical receiver 18 converts the light signal received through the photodiodes 106 into electric signals, and outputs the electric signals to the display 12 to display an image.

Here, in the present exemplary embodiment, the video signal is transmitted via the optical fiber 20, and the DDC control signal is transmitted via the LAN cable 46. However, when the LAN cable 46 is not connected, the video signal can also be transmitted by the optical fiber 20.

Figure 3:
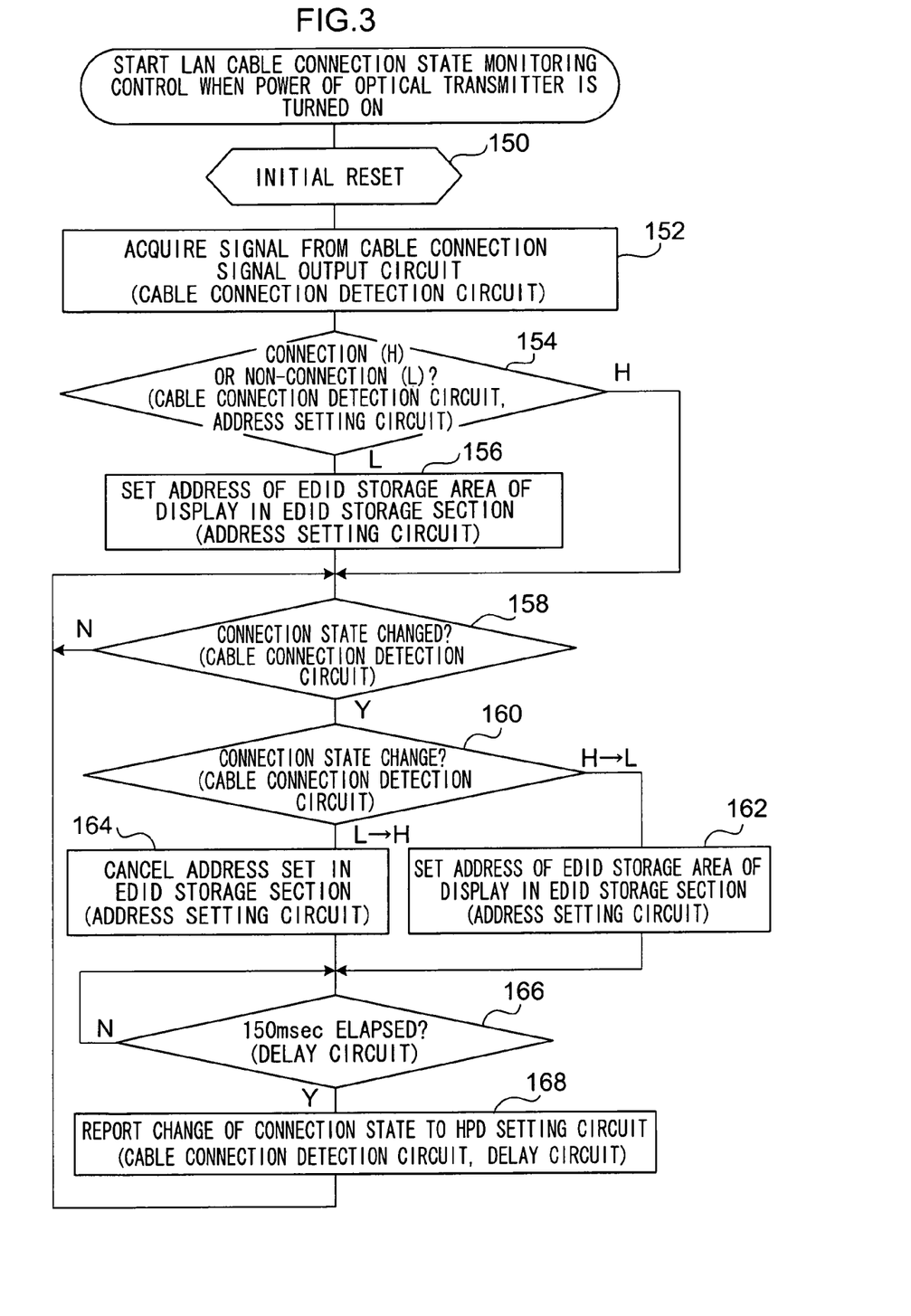
FIG. 3 is a flowchart illustrating a flow of LAN cable connection state monitoring control executed by an optical transmitter cable connection circuit, an address setting circuit, and a delay circuit, according to an exemplary embodiment of the present invention.

FIG. 3 is a flowchart illustrating a flow of LAN cable connection monitoring control in the cable connection circuit 118, the address setting circuit 122, and the delay circuit 128 of the optical transmitter 16, that starts when the power of the optical transmitter is turned ON.

In step 150, an initial resetting is performed, and in step 152, the cable connection detection circuit 118 acquires the signal from the cable connection signal output circuit 120.

In step 154, it is determined whether the signal detected by the cable connection detection circuit 118 is H signal that indicates a connection state or L signal that indicates a disconnection state. The result of determination is reported to the address setting section 122.

In step 156, if the reported signal is L signal, the address setting section 122 sets an address of the EDID storage area of the display 12 in the EDID storage section 116 of the optical transmitter 16, and proceeds to step 158. Also, in step 154, if the reported signal is H signal, the address setting unit 122 proceeds to step 158.

Accordingly, the host computer 10 can acquire the EDID as described above, regardless of connection state of the LAN cable 46.

In step 158, by the monitoring performed by the cable connection detection circuit 118, it is determined whether the connection state has changed or not.

Here, if the connection state has changed, the process proceeds from step 158 to step 160, and is determined whether the change of the connection state is from H to L (the connected LAN cable 46 has been disconnected) or from L to H (the disconnected LAN cable 46 has been connected).

In step 160, if it is determined that the change is from H to L, the process proceeds to step 162, and the address of the EDID storage area of the display 12 is set in the EDID storage section 116. Then, the process proceeds to step 166. On the other hand, if it is determined that the change is from L to H in step 160, the process proceeds to step 164, and the address of the EDID storage area of the display 12 that is set in the EDID storage section 116 is canceled. Then the process proceeds to step 166.

Next, in step 166, the delay circuit 128 waits for the state that has been set in step 162 or 164 for 150 msec, and then proceeds to step 168 to report that the connection state of the HPD setting circuit 124 has been changed.

The host computer 10 executes the DDC communication control process again if the signal from the HPD setting circuit 124 becomes L signal for equal to or longer than 100 msec.

When the connected LAN cable 46 has been disconnected, the HPD setting circuit 124 is shifted from the state (a) to the state (d) in Table 1. In this case, since the output of a false H signal is delayed for 150 msec in which the L signal is maintained, the host computer 10 obtains the timing for executing the DDC communication control process.

Also, when the disconnected LAN cable 46 has been connected, the HPD setting circuit 124 is shifted from the state (d) to the state (a). In this case, since the connection is reported to the HPD setting circuit after a delay time of 150 msec, the HPD setting circuit 124 is in an actually non-existing combination state (which does not exist in Table 1) in which the LAN cable 46 is not connected (L signal) and the HPD detection circuit 126 detects the display (H signal). Accordingly, the output of the HPD setting circuit 124 becomes in a non-signal state (equal to the L signal), and after a delay time of 150 msec, the HPD setting circuit 124 is shifted to the state (a) in Table 1 to output a H signal, resulting in that the host computer 10 obtains the timing for executing the DDC communication control process. In this case, in order to cope with the case where the disconnected LAN cable 46 has been connected, a delay circuit may be separately installed between the HPD setting circuit 124 and the HPD detection circuit 126.

In the present exemplary embodiment, a case in which the connection state of the LAN cable 46 is monitored and controlled by circuits has been described. However, the cable connection circuit 118, the address setting circuit 122, and the delay circuit 128 are electrical circuits, and thus are not operated by a software program. Note that the connection state monitoring control explained in the flowchart is to clarify the flow of process.

By contrast, instead of the circuit operation as described above, the connection state monitoring control of the LAN cable 46 may be executed by a software program under a hardware configuration of a computer including a CPU, a RAM, a ROM, and a bus.

In the above present exemplary embodiment, a case in which the delay circuit 128 is installed to cope with the case where the connection state of the LAN cable 46 is changed after power on (after the DDC communication control process is executed) has been described. However, if the configuration has been made such that the connection state of the LAN cable 46 does not change after power ON, the delay circuit 128 may be unnecessary.

Figure 4:
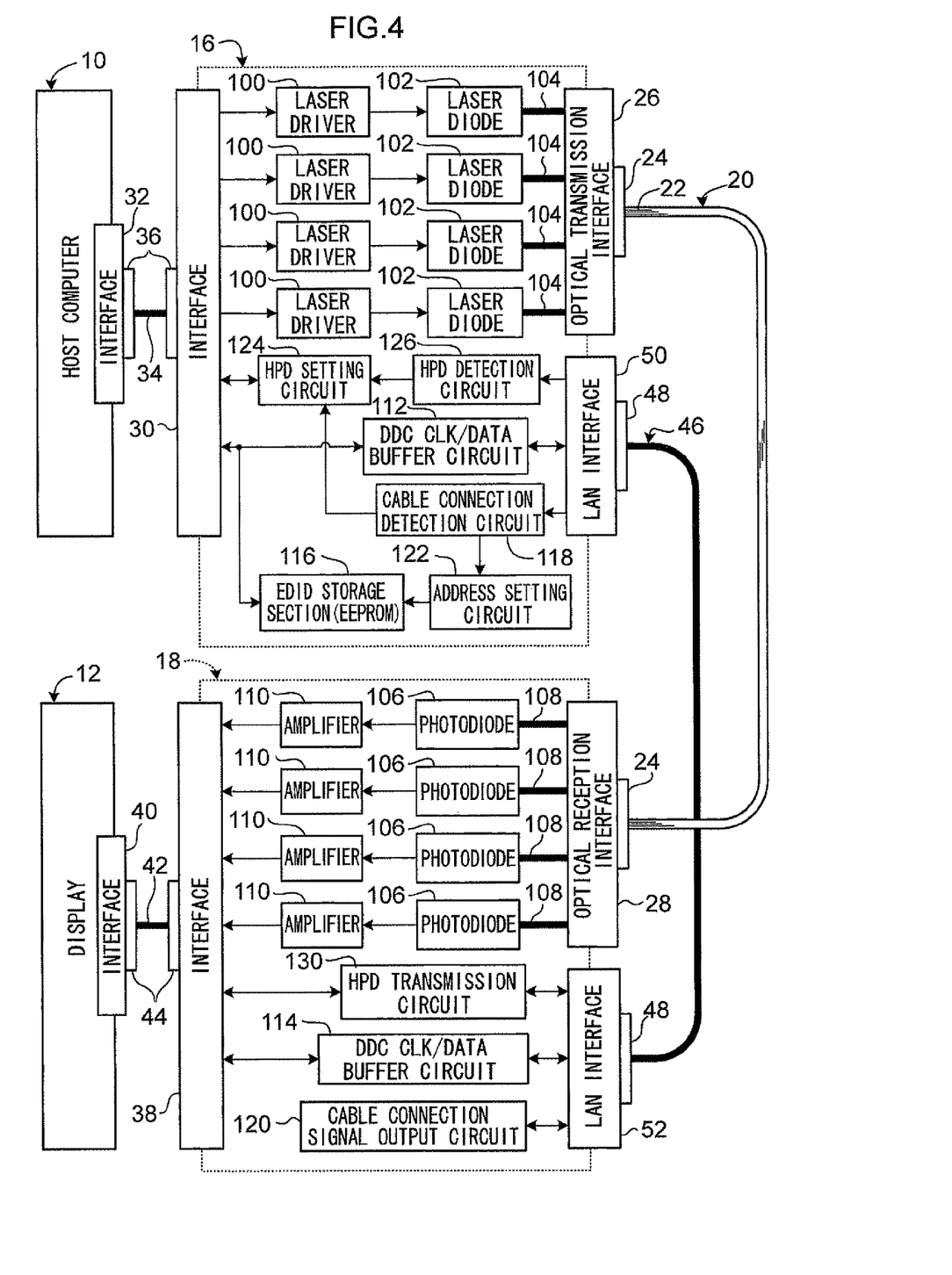
FIG. 4 is a functional block diagram illustrating an electrical connection in a video signal transmission system according to an alternative exemplary embodiment of the present invention.

FIG. 4 is a functional block diagram illustrating an electrical connection in a video signal transmission system without the delay circuit 128 according to an alternative exemplary embodiment of the present invention. Since the difference between the circuits in FIG. 2 and FIG. 4 is only the existence of the delay circuit 128, the same reference numerals are used, and the explanation of the configuration will be omitted.

The foregoing description of the exemplary embodiments of the present invention has been provided for the purposes of illustration and description. It is not intended to be exhaustive or to limit the present invention to the precise forms disclosed. Obviously, many modifications and variations will be apparent to practitioners skilled in the art. The exemplary embodiments were chosen and described in order to best explain the principles of the present invention and its practical applications, thereby enabling others skilled in the art to understand the present invention for various embodiments and with the various modifications as are suited to the particular use contemplated. It is intended that the scope of the present invention be defined by the following claims and their equivalents.

What is claimed is:

1. A video signal transmission apparatus comprising:
   an optical transmitter, connected to a video source device, that uni-directionally transmits video data input from the video source device;
   an optical receiver, connected to a sink device, that receives the video data transmitted from the optical transmitter and outputs the received video data to the sink device;
   a first transmission medium, connected to the optical transmitter and the optical receiver, that transmits the video data at a speed higher than a predetermined reference transmission speed;
   a second transmission medium, connected to the optical transmitter and the optical receiver independently from the first transmission medium, that transmits identification information for identifying the sink device at a speed lower than the predetermined reference transmission speed;
   the second transmission medium having two ends;
   an identification information acquisition control section, provided in the optical transmitter, that acquires the identification information from the sink device through a bidirectional communication using the second transmission medium in accordance with a request from the video source device;
   a storage section, provided in the optical transmitter, that stores general-purpose identification information generally used for a plurality of types of sink devices that are connectable to the optical receiver;
   an acquisition possibility determination section that determines whether the identification information can be acquired from the sink device through the second transmission medium; and
   a general-purpose identification information reply control section that replies the general-purpose identification information stored in the storage section to the video source device if the acquisition possibility determination section determines that the identification information cannot be acquired from the sink device through the second transmission medium; and
   a setting section provided at the optical transmitter which is configured to falsely report to the video source device that the video source device is connected to the sink device when the sink device is not connected to the optical transmitter via the second transmission medium, the second transmission medium being connected to the optical transmitter and the optical receiver respectively at the two ends, the identification information being transmitted from the sink device through the second transmission medium.

2. The video signal transmission apparatus according to claim 1, wherein the identification information is preferentially acquired from the sink device when the second transmission medium is connected to the optical transmitter and the optical receiver.

3. The video signal transmission apparatus according to claim 2, further comprising:
an identification information acquisition condition determination section that instructs the identification information acquisition control section to acquire the identification information from the sink device by converting a detection signal into a false detection signal, when a period in which the identification information cannot be acquired from the sink device exceeds a predetermined period; and
a delay section that delays a reply of the general-purpose identification information equal to or longer than the predetermined period from a time when the acquisition possibility determination section determines that the identification information cannot be acquired, to perform the conversion of a true connection signal to the false detection signal,
wherein the identification information acquisition control section acquires the identification information from the sink device whenever a connection state of the second transmission medium changes.

4. The video signal transmission apparatus according to claim 1, further comprising:
an identification information acquisition condition determination section that instructs the identification information acquisition control section to acquire the identification information from the sink device by converting a detection signal into a false detection signal, when a period in which the identification information cannot be acquired from the sink device exceeds a predetermined period; and
a delay section that delays a reply of the general-purpose identification information equal to or longer than the predetermined period from a time when the acquisition possibility determination section determines that the identification information cannot be acquired, to perform the conversion of a true connection signal to the false detection signal,
wherein the identification information acquisition control section acquires the identification information from the sink device whenever a connection state of the second transmission medium changes.

5. The video signal transmission apparatus according to claim 1, wherein the identification information and the general-purpose identification information are a display identification code.

6. A video signal transmission apparatus comprising:
a first transmission medium, connected to a video source device and a sink device, that transmits video data;
a second transmission medium connected to an optical transmitter at a first end, and an optical receiver at a second end, the identification information being transmitted from the sink device through the second transmission medium,
a transmission control section that executes transmission of the video data and the identification information via the first transmission medium;
a storage section, provided at the source device side, that stores general-purpose identification information generally used in the sink device;
a setting section provided at the optical transmitter which is configured to falsely report to the video source device that the video source device is connected to the sink device when the sink device is not connected to the optical transmitter via the second transmission medium; and
a switching control section that switches to acquire the general-purpose identification information stored in the storage section when the identification information cannot be acquired from the sink device through the second transmission medium during the transmission by the transmission control section.

7. A method of acquiring identification information in a video signal transmission system including an optical transmitter and an optical receiver respectively connected to both ends of an optical fiber that transmits video data, a video source device connected to the optical transmitter, a sink device connected to the optical receiver, and a metal cable, provided between the optical transmitter and the optical receiver independently from the optical fiber, through which at least the video source device acquires identification information of the sink device, wherein the video source device corrects a video signal based on the identification information acquired by designating an address of an storage area in which the identification information of the sink device is stored, and transmits the corrected video signal through the optical fiber, the method comprising:
transmitting the identification information from the sink device through the metal cable;
recognizing, by the optical transmitter, the address and storing general-purpose identification information generally used in sink devices at the same address as the recognized address in a storage area;
setting the address at the storage area in the optical transmitter when it is detected that the metal cable is not connected;
acquiring, by the video source device, the general-purpose identification information from the storage medium when the identification information cannot be acquired from the sink device through the metal cable; and
falsely reporting to the video source device that the video source device is connected to the sink device when the sink device is not connected to the optical transmitter via the metal cable.

8. A non-transitory computer readable storage medium storing a program causing a video signal transmission system, including an optical transmitter and an optical receiver respectively connected to both ends of an optical fiber that transmits video data, a video source device connected to the optical transmitter, a sink device connected to the optical receiver, and a metal cable, provided between the optical transmitter and the optical receiver separately from the optical fiber, through which at least the video source device acquires identification information of the sink device, wherein the video source device corrects a video signal based on the identification information acquired by designating an address of an storage area in which the identification information of the sink device is stored, and transmits the corrected video signal through the optical fiber, to execute a process for acquiring the identification information, the process comprising:
transmitting the identification information from the sink device through the metal cable;
recognizing, by the optical transmitter, the address and storing general-purpose identification information generally used in the sink device in the same address as the recognized address in a storage area;
setting the address at the storage area in the optical transmitter when it is detected that the metal cable is not connected;
acquiring, by the video source device, the general-purpose identification information from the storage medium when the identification information cannot be acquired from the sink device through the metal cable; and falsely reporting to the video source device that the video source device is connected to the sink device when the sink device is not connected to the optical transmitter via the metal cable.

\* \* \* \* \*